United States Patent
Kim et al.

(10) Patent No.: US 9,357,501 B2
(45) Date of Patent: *May 31, 2016

(54) METHOD AND APPARATUS OF TRANSMITTING PPDU IN WIRELESS LOCAL AREA NETWORK

(75) Inventors: Eun Sun Kim, Anyang-si (KR); Yong Ho Seok, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 180 days.

This patent is subject to a terminal disclaimer.

(21) Appl. No.: 13/577,879

(22) PCT Filed: Oct. 26, 2010

(86) PCT No.: PCT/KR2010/007385
§ 371 (c)(1),
(2), (4) Date: Oct. 24, 2012

(87) PCT Pub. No.: WO2011/099687
PCT Pub. Date: Aug. 18, 2011

(65) Prior Publication Data
US 2013/0034091 A1    Feb. 7, 2013

Related U.S. Application Data

(60) Provisional application No. 61/302,552, filed on Feb. 9, 2010, provisional application No. 61/305,545, filed on Feb. 18, 2010.

(30) Foreign Application Priority Data

Aug. 11, 2010    (KR) .......................... 10-2010-0077516

(51) Int. Cl.
H04W 4/00    (2009.01)
H04W 52/16    (2009.01)
H04W 72/04    (2009.01)
(Continued)

(52) U.S. Cl.
CPC .......... *H04W 52/16* (2013.01); *H04W 72/0453* (2013.01); *H04W 16/14* (2013.01); *H04W 84/12* (2013.01)

(58) Field of Classification Search
USPC ......... 370/335, 338, 342, 320, 441, 317, 332, 370/455, 465, 479; 375/E1.003, E21.003, 375/E1.016, E1.032, 145; 714/758, 776, 714/E11.032, 746, 752, 755
See application file for complete search history.

(56) References Cited

U.S. PATENT DOCUMENTS

2003/0231658 A1* 12/2003 Liang et al. .................. 370/469
2005/0111345 A1*  5/2005 Jacobsen et al. ............. 370/203
(Continued)

FOREIGN PATENT DOCUMENTS

EP    1420401 A1    5/2004
KR    10-2008-0068025 A    7/2008
(Continued)

*Primary Examiner* — Phuongchau Ba Nguyen
(74) *Attorney, Agent, or Firm* — Birch, Stewart, Kolasch & Birch, LLP

(57) ABSTRACT

A method for transmitting a physical protocol data unit (PPDU) in a wireless local area network (WLAN) is provide. The method includes generating a PPDU frame comprising a signal field and a data field and transmitting the PPDU frame, in which a transmission bandwidth for transmitting the signal field is fixed, but a transmission bandwidth for transmitting the data field is variable.

8 Claims, 9 Drawing Sheets

(51) Int. Cl.
*H04W 16/14* (2009.01)
*H04W 84/12* (2009.01)

(56) References Cited

U.S. PATENT DOCUMENTS

| | | | |
|---|---|---|---|
| 2006/0182017 A1* | 8/2006 | Hansen et al. | 370/208 |
| 2006/0203785 A1* | 9/2006 | Kim | 370/338 |
| 2006/0280134 A1* | 12/2006 | Kwon | H04L 29/06 370/278 |
| 2006/0280153 A1* | 12/2006 | Kwon et al. | 370/338 |
| 2007/0070691 A1* | 3/2007 | Walvis et al. | 365/185.03 |
| 2007/0070881 A1* | 3/2007 | Olgaard et al. | 370/208 |
| 2007/0167140 A1 | 7/2007 | Grandhi et al. | |
| 2007/0242766 A1 | 10/2007 | Xu et al. | |
| 2007/0298742 A1* | 12/2007 | Ketchum et al. | 455/186.1 |
| 2008/0045153 A1* | 2/2008 | Surineni et al. | 455/63.1 |
| 2008/0090575 A1* | 4/2008 | Barak et al. | 455/444 |
| 2008/0187066 A1* | 8/2008 | Wang et al. | 375/267 |
| 2008/0232490 A1* | 9/2008 | Gross | H04W 28/18 375/260 |
| 2009/0010234 A1* | 1/2009 | Li | H04W 40/02 370/338 |
| 2009/0122694 A1* | 5/2009 | Stephens et al. | 370/210 |
| 2010/0260092 A1* | 10/2010 | Nagaraja | H04B 7/024 370/315 |
| 2011/0305233 A1* | 12/2011 | Seok | H04W 52/248 370/338 |
| 2012/0127940 A1* | 5/2012 | Lee et al. | 370/329 |
| 2013/0170345 A1* | 7/2013 | Merlin et al. | 370/230 |
| 2013/0294397 A1* | 11/2013 | Lee et al. | 370/329 |

FOREIGN PATENT DOCUMENTS

| | | |
|---|---|---|
| KR | 10-2009-0006104 A | 1/2009 |
| KR | 10-2009-0020654 A | 2/2009 |

* cited by examiner

METHOD AND APPARATUS OF TRANSMITTING PPDU IN WIRELESS LOCAL AREA NETWORK

CROSS REFERENCE TO RELATED APPLICATIONS

This application is the National Stage of PCT/KR2010/007385 filed on Oct. 26, 2010, which claims the benefit of U.S. Provisional Application No. 61/302,552 filed on Feb. 9, 2010, U.S. Provisional Application No. 61/305,545 filed on Feb. 18, 2010 and claims benefit to Korean Application No. 10-2010-0077516 filed in the Republic of Korea on Aug. 11, 2010, all of which are hereby incorporated by reference into the present application.

TECHNICAL FIELD

The present invention relates to wireless communications, and more particularly, to a method and apparatus of transmitting a physical protocol data unit (PPDU) frame in a wireless local area network (WLAN).

BACKGROUND ART

With recent development of information and communications technology, various wireless communications technology has been developed. Among them, a wireless local area network (WLAN) is technology that allows portable user equipment such as a personal digital assistant (PDA), a laptop computer, a portable multimedia player (PMP), etc. in a home, an enterprise or a certain service providing zone to have wireless access to high-speed Internet on the basis of radio frequency technology.

It is presupposed that communications in the WLAN based on institute of electrical and electronics engineers (IEEE) 802.11 standards are performed within a zone called a basic service set (BSS). The BSS zone has a somewhat indefinite boundary since it may vary depending on propagating characteristics of a wireless medium. Such a BSS is basically divided into two configurations of an independent BSS (IBSS) and an infrastructure BSS. The former indicates a BSS that forms a self-contained network and does not allows access to a distribution system (DS), and the latter indicates a BSS that includes one or more access points (AP), a distribution system, etc. and generally employs the AP in all communications including communication between stations.

The station (STA) having desire to access a wireless network may use two scanning methods for searching an accessible wireless network (BSS or IBSS), i.e., a candidate AP or the like.

One is passive scanning, which uses a beacon frame transmitted from the AP (or STA). That is, the STA having desire to access a wireless network periodically receives the beacon frames from the AP or the like managing a relevant BSS (or IBSS), thereby finding the accessible BSS or IBSS.

The other is active scanning. The STA having desire to access the wireless network first transmits a probe request frame. Then, the STA or AP that receives the probe request frame responds with a probe response frame.

There are frequency bands that can be shared by other kinds of wireless communication systems, one of which is a television white space (TV WS). The TV WS is an idle frequency band remained as an analog TV becomes digitalized, and this band corresponds to a spectrum of 512~698 MHz assigned for TV broadcasting. If a licensed device having priority to use a relevant frequency domain does not use this frequency band, an unlicensed device can use this frequency band.

If the IEEE 802.11 is applied to the TV WS, there is an advantage that coverage is noticeably extended due to the spectrum characteristics of the TV WS. However, in general, if the coverage is extended, the number of STAs within the coverage is definitely increased. As the number of STAs increases, a method for flexibly managing users, i.e., scalability becomes an object of concern. Further, since various wireless communication systems and various unlicensed devices coexist, a problem of coexistence occurs. If distributed coordination function (DCF) and enhanced distributed channel access (EDCA) protocols of IEEE 802.11 are applied to this environment, the problem of scalability may grow worse.

The DCF is a channel access mechanism used in IEEE 802.11 and based on carrier sense multiple access/collision avoidance (CSMA/CA). Also, the EDCA corresponds to a competition-based medium access method among channel access models proposed in a hybrid coordination function (HCF) provided by extension of a general medium access control protocol. The HCF is a protocol provided by IEEE 802.11e proposed to guarantee quality of service (QoS).

To use the TV WS, an unlicensed device has to get a channel available in a relevant zone on the basis of geo-location database. Also, there is a need for scanning to solve the problem of coexistence between the unlicensed devices using the TV WS.

In the WLAN supporting a TV WS band, the STA may use a channel not used by a licensed device. However, if it is detected or sensed that the licensed device is using a neighbor channel adjacent to a channel currently being in use, the STA is required to lower transmission power so as to decrease interference with the licensed device. However, because transmission coverage becomes narrower when the transmission power is lowered, it may cause a hidden node problem or decrease a transmission rate.

Accordingly, there is a need for a method of transmitting a frame while accompanying control of a transmission channel bandwidth and transmission power in the WLAN supporting the TV WS band.

SUMMARY OF INVENTION

Technical Problem

The present invention provides a method and apparatus for transmitting a frame in a WLAN supporting a TV WS band.

Solution to Problem

In an aspect of the invention, there is provided a method for transmitting a physical layer convergence procedure (PLCP) protocol data unit (PPDU) of a station (STA) in a wireless local area network (WLAN). The method includes generating a PPDU including a signal field and a data field and transmitting the PPDU. A transmission bandwidth for transmitting the signal field is fixed, but a transmission bandwidth for transmitting the data field is variable.

A transmission power for transmitting the signal field may be greater than transmission power for transmitting the data field.

The PPDU may be transmitted in a television white space (TV WS) band.

The transmission bandwidth for transmitting the signal field may be 5 MHz.

A transition gap may be provided between the signal field and the data field.

The signal field may include a transition gap field indicating whether the transition gap exists or not.

The signal field may further include a bandwidth field indicating a bandwidth where the data field is transmitted.

The signal field further may include an extended guard interval (GI) field indicating whether to use an extended GI of the data field.

The PPDU may further include a PLCP preamble arranged in a front of the signal field and used for synchronization, and a pilot sequence arranged between the signal field and the data field and used for demodulation of the data field.

A transmission bandwidth for transmitting the PLCP preamble may be the same transmission bandwidth for transmitting the signal field A transmission bandwidth for transmitting the pilot sequence may be the same transmission bandwidth for transmitting the data field.

The pilot sequence may include a white space (WS) short training field (STF) with information about timing acquisition and frequency synchronization acquisition according to variation of the transmission bandwidth, and a WS long training field (LTF) with information about channel estimation and frequency synchronization acquisition according to variation of the transmission bandwidth.

In another aspect of the invention, a wireless apparatus for transmitting a physical layer convergence procedure (PLCP) protocol data unit (PPDU) of a station (STA) in a wireless local area network (WLAN) is provided. The wireless apparatus includes an interface unit which transmits the PPDU and a processor which functionally connects with the interface unit and generates the PPDU including a signal field and a data field A transmission bandwidth for transmitting the signal field is fixed, but a transmission bandwidth for transmitting the data field is variable.

Transmission power for transmitting the signal field may be greater than transmission power for transmitting the data field.

Advantageous Effects of Invention

It is possible to prevent a wireless apparatus using a TV WS from causing interference with a licensed device using a neighbor channel. Also, receiving of information contained in a physical layer convergence procedure (PLCP) header is maximally assured to thereby decrease a hidden node problem and guarantee reliable communication.

MODE FOR THE INVENTION

Figure 1:
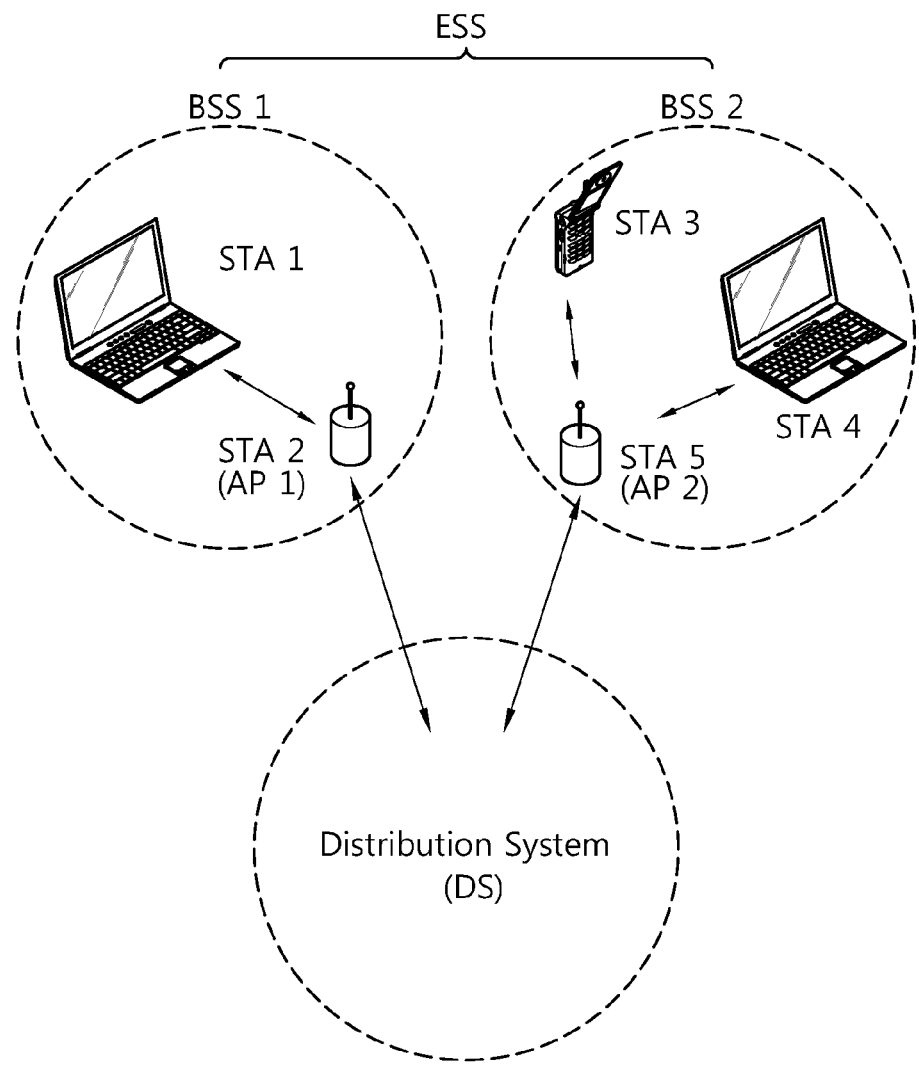
FIG. 1 shows configuration of a wireless local area network (WLAN) system according to an exemplary embodiment of the present invention.

Below, exemplary embodiments of the present invention will be described in detail with reference to accompanying drawings so as to be easily realized by a person having ordinary knowledge in the art. However, the present invention may be embodied in various forms without being limited to the exemplary embodiments set forth herein. In the drawings, unrelated parts are omitted for clearly explaining the present invention, and like reference numerals refer to like elements throughout. Further, descriptions of a part that can be easily appreciated by those skilled in the art are omitted.

FIG. 1 shows configuration of a wireless local area network (WLAN) system according to an exemplary embodiment of the present invention.

Referring to FIG. 1, the WLAN system includes one or more basic service set (BSS). The BSS is a group of stations (STA) which can successfully synchronize and communicate with one another, and does not mean a certain zone.

An infrastructure BSS (BSS1, BSS2) includes one or more non-access point (AP) STAs (non-AP STA1, non-AP STA2, non-AP STA2); APs (AP STA1, AP STA2) providing distribution service; and a distribution system (DS) connecting the plurality of APs (AP STA1, AP STA2). In the infrastructure BSS, the AP manages the non AP STAs.

On the other hand, an independent BSS (IBSS) is a BSS that operates in an Ad-Hoc mode. Since the IBSS does not include the AP, there is no centralized management entity that performs centralized management. That is, in the IBSS, the non-AP STAs are managed in a distributed manner. In the IBSS, all STAs may be provided as mobile STAs and constitute a self-contained network since access to the DS is not allowed.

The STA is a predetermined functional medium having a medium access control (MAC) and a physical layer interface for a wireless medium, based on institute of electrical and electronics engineers (IEEE) 802.11 standards, which broadly includes both the AP and the non-AP STA.

The non-AP STA is not the AP but the STA, the STA may also refer to the non-AP STA. Further, the non-AP STA may be called a mobile terminal, a wireless transmit/receive unit (WTRU), user equipment (UE), a mobile station (MS), a mobile subscriber unit, or the like.

The AP is a functional entity that provides access to the DS via a wireless medium for the STA associated with the AP. In the infrastructure BSS including the AP, communication between the non-AP STAs is basically performed via the AP, but direct communication between the non-AP STAs may be possible if a direct link is set. The AP may be also called a central controller, a base station (BS), a node-B, a base transceiver system (BTS), a cite controller, or the like.

The plurality of infrastructure BSSs may be connected to one another through the distribution system (DS). The plurality of BSSs connected through the DS is called an extended service set (ESS). The STAs included in the ESS can communicate with one another, and the non-AP STAs within one ESS can move from one BSS to another BSS while performing the communication without disconnection.

The DS is a mechanism that enables one AP to communicate with another AP. Through the DS, the AP can transmit a frame for the STAs associated with the BS managed by the AP, transmit a frame when one STA moves to another BSS, or transmit a frame to an external network such as a wired network or the like. The DS is not necessarily a network, but may be achieved without any limitation as long as it can provide predetermined distribution service based on IEEE 802.11. For example, the DS may be a wireless network such as a mesh network, or a physical structure connecting the APs with one another.

A television white space (TV WS) is an idle frequency band remained as an analog TV becomes digitalized in U.S.A, and corresponds to a band of 512~698 MHz. However, this is nothing but an example. The TV WS may be an authorized band that can be first used by a licensed user. The licensed user indicates a user allowed to use the authorized band, and may be also called a licensed device, a primary user, an incumbent user, or the like.

The STA that supports a TV WS band and is not licensed is called a WS STA. Further, the AP that supports a TV WS band and is not licensed is called a WS AP.

The WS AP or WS STA that operates in the TV WS has to provide a protection function with regard to the licensed user, the reason of which is because the licensed user has priority in using the TV WS band. For example, if a licensed user such as a microphone is already using a certain WS channel of a frequency band divided to have a certain bandwidth in the TV WS band according to a protocol, the WS AP or the WS STA cannot use a frequency band corresponding to the relevant WS channel so as to protect the licensed user. Also, the WS AP or the WS STA has to stop using a frequency band when the licensed user uses the corresponding frequency band being currently used by the WS AP or the WS STA for transmitting and/or receiving a frame.

Thus, the WS AP or the WS STA has to previously undergo a procedure of determining whether a certain frequency band within the TV WS band is available, i.e., whether the licensed user occupies the certain frequency band. Determination of whether the licensed user occupies a certain frequency band is called spectrum sensing. As a spectrum sensing mechanism, an energy detection method, a signature detection method, etc. are used. It is possible to determine that the licensed user is in use if strength of a received signal is equal to or higher than a certain value, or if a DTV preamble is detected.

The WS AP previously performs the sensing with regard to each WS channel, or senses a certain WS channel and reports a sensed result to the WS STA as necessary. Thus, the WS AP grasps the state of each WS channel and allows an available other frequency band to be selected if the certain frequency band being in use is not available anymore due to an entry of the licensed user. In some cases, if the frequency band being in use is not available anymore, a reserve frequency band to be used may be previously set and reported to the WS STA.

Meanwhile, in the case that the licensed user is using the WS channel adjacent to the frequency band available for the WS STA, interference may occur if the WS STA continuously uses this frequency band. Thus, there is a need for avoiding or minimizing the interference.

To reduce the interference, there has been proposed a method that the WS STA limits transmission power in the corresponding frequency band. However, as the transmission power is limited, transmission coverage becomes narrower and thus a hidden node problem arises.

Figure 2:
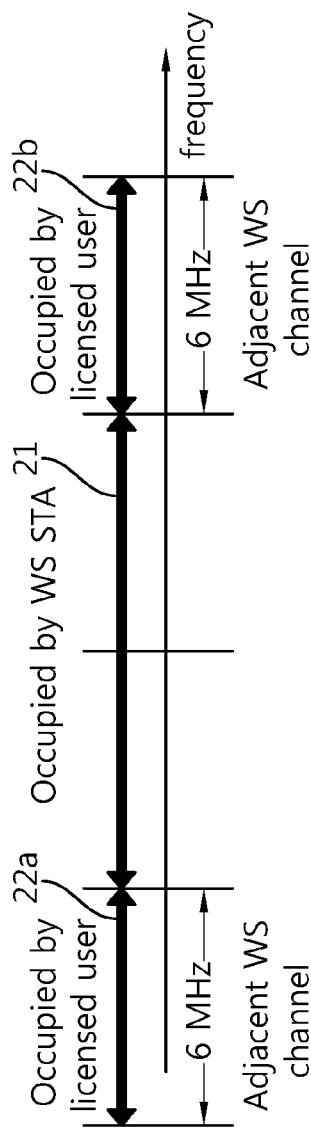
FIG. 2 shows an example of using a frequency band within a TV WS band.

FIG. 2 shows an example of using a frequency band within a TV WS band.

TV band devices such as the WS AP and the WS STA may use about 30 channels in a standard unit of a bandwidth of 6 MHz within the TV WS. To use these channels, it has to be presupposed that the licensed user does not exist in a certain channel to be used.

Suppose that each bandwidth of the WS channels 22a and 22b being used by the licensed user is 6 MHz. According to IEEE 802.11a, since the STA supports at least one of 5 MHz, 10 MHz and 20 MHz, let the WS AP and the WS STA have the fundamental frequency bandwidth of 5 MHz. Thus, the WS AP and the WS STA can support a frequency bandwidth of 10 MHz or 20 MHz by regarding 5 MHz as the fundamental frequency bandwidth, according to how many WS channels are successively unoccupied.

Hereinafter, a term "transmission channel" will be used for convenience of description. The transmission channel refers to a physical wireless resource that is used by a wireless apparatus such as the WS AP, the WS STA, etc. for transmitting a wireless signal such as a frame in a certain frequency band, which is different from the WS channel used by the licensed user in the TV WS band and divided to have a certain bandwidth according to a protocol.

Assume that the WS STA can use a central band 21 in the TV WS, the licensed user is using both adjacent channels 22a and 22b with regard to the central band 21, and the central band 21 is a bandwidth of the transmission channel.

The WS STA has to decrease the transmission power of the transmission channel 21 if sensing a signal of the licensed user in the WS channels 22a and 22b adjacent to the transmission channel 21 being used by the WS STA. This is to reduce the interference with the licensed user. For example, the maximum transmission power of the WS STA is 100 mW, but the maximum transmission power may be limited to 40 through 50 mW when the adjacent WS channels 22a and 22b are being used by the licensed user. However, using a channel with broader bandwidth doesn't always cause getting a higher throughput. In some cases, higher transmission power may be more effective instead of using a transmission channel having a relatively narrow bandwidth.

If the transmission power is lowered, the coverage decreases and the hidden node problem may arise. In particular, if a physical layer convergence procedure (PLCP) header in a physical protocol data unit (PPDU) of the WS AP and/or WS STA is transmitted with low transmission power, another WS AP and/or WS STA may not receive the corresponding PLCP header at a coverage edge of the WS AP and/or WS STA. Therefore, the WS AP and/or WS STA may not correctly perform channel clear assessment (CCA) detection.

Figure 3:
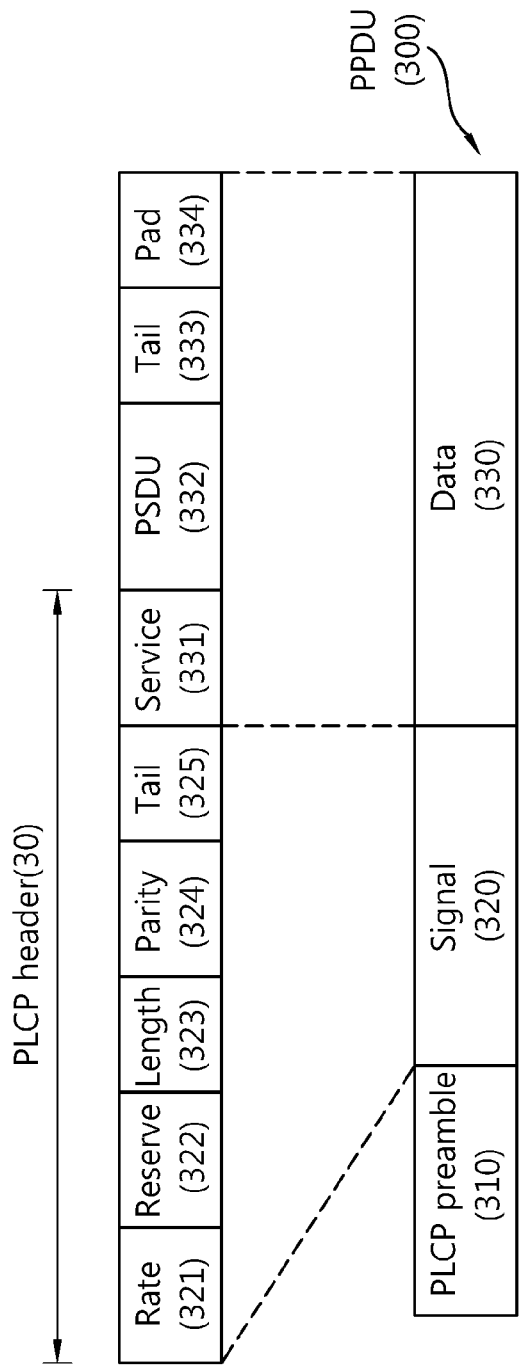
FIG. 3 shows a format of a PPDU frame in a WLAN.

FIG. 3 shows a format of a PPDU in a WLAN. This can be referred to the section in "Part 11: Wireless LAN Medium Access Control (MAC) and Physical Layer (PHY) specifications" of IEEE P802.11-2007.

A PPDU 300 includes a physical layer control procedure (PLCP) preamble 310, and a signal field 320 and a data field 330.

The PLCP preamble 310 includes a training sequence for a symbol synchronization and timing synchronization of PPDU.

The signal field 320 includes a rate field 321, a reserve field 322, a length field 323, a parity field 324 and a tail field 325 of the PLCP header 30. The signal field 320 may be transmitted in an orthogonal frequency division multiplexing (OFDM) symbol.

The rate field 321 indicates a data rate.

The length field 323 may indicate the number of octets of PSDU 332 that the MAC layer currently requests the physical layer to transmit, the PPDU 300 to be transmitted, or the data field 330.

The parity field 324 is a field indicating a parity bit for preventing data error.

The data field 330 includes a service field 331 of the PLCP header 30, the PSDU 332 and the tail field 333. Also, the data field 330 may further include a padding field 334 to keep with the octet of the PPDU 330. The service field 331 is used in initializing a scrambler.

In the WLAN system, the frame transmitted and/or received by the WS STA and/or WS AP is provided in the form of the above PPDU 300. The PPDU 300 is transmitted through a plurality of OFDM symbols.

As described above referring to FIG. 2, if the transmission channel of a broad bandwidth is used, the transmission power may be constrained and at this time another WS STA and/or WS AP located at the transmission coverage edge of the WS STA and/or WS AP may not receive a signal field. Thus, there will be below proposed a method of maximally guaranteeing that the PLCP header is transmitted with the maximum power transmission using a fundamental transmission channel (a bandwidth of 5 MHz) even though the broadband transmission channel is used in transmitting the frame.

According to an exemplary embodiment, the transmission channel of the WS STA and WS AP uses bandwidths of 5 MHz, 10 MHz and 20 MHz, the maximum normal transmission power is 100 mW, and the maximum constrained transmission power is 40 mW. However, this is nothing but an example.

Figure 4:
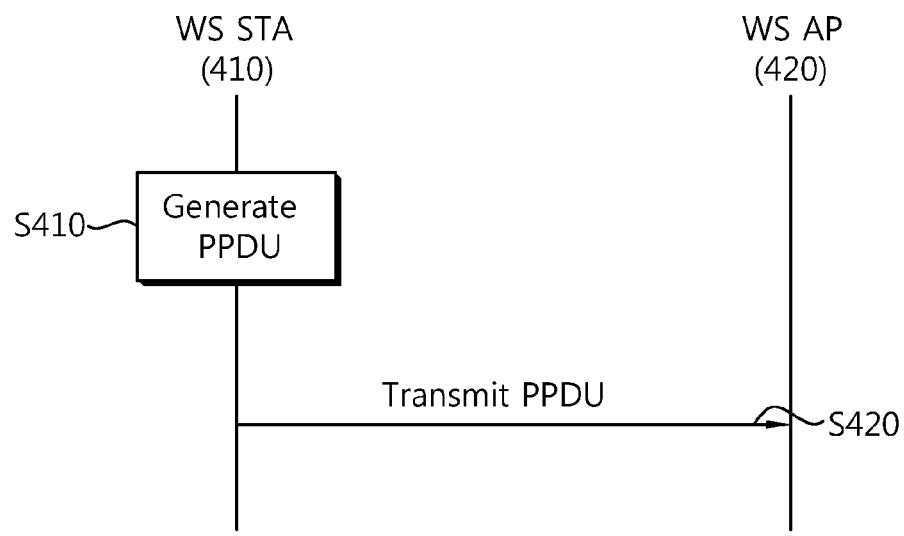
FIG. 4 shows a flowchart of a frame transmission method according to an exemplary embodiment.

FIG. 4 shows a flowchart of a frame transmission method according to an exemplary embodiment.

Referring to FIG. 4, the WS STA 410 generates a PPDU to be transmitted to the WS AP 420 (S410). A detailed structure of the PPDU according to an exemplary embodiment will be described later.

The WS STA 410 transmits the PPDU to the WS AP 420.

The PLCP header and the data field in the PPDU may be transmitted with different transmission power in different frequency bands. Below, a frequency band to be used for transmitting the PLCP header will be called a first transmission channel, and a frequency band to be used for transmitting the data field will be called a second transmission channel.

The first transmission channel has a fixed bandwidth, but the second transmission channel has a variable bandwidth. The bandwidth of the first transmission channel may be smaller than that of the second transmission channel. The bandwidth of the first transmission channel may be fixed to 5 MHz. This is for maximally guaranteeing the maximum transmission power when transmitting the PLCP header through the first transmission channel.

The second transmission channel occupies a certain frequency band within the unoccupied TV WS band ascertained by the result from the spectrum sensing performed by the WS STA and/or WS AP.

Figure 5:
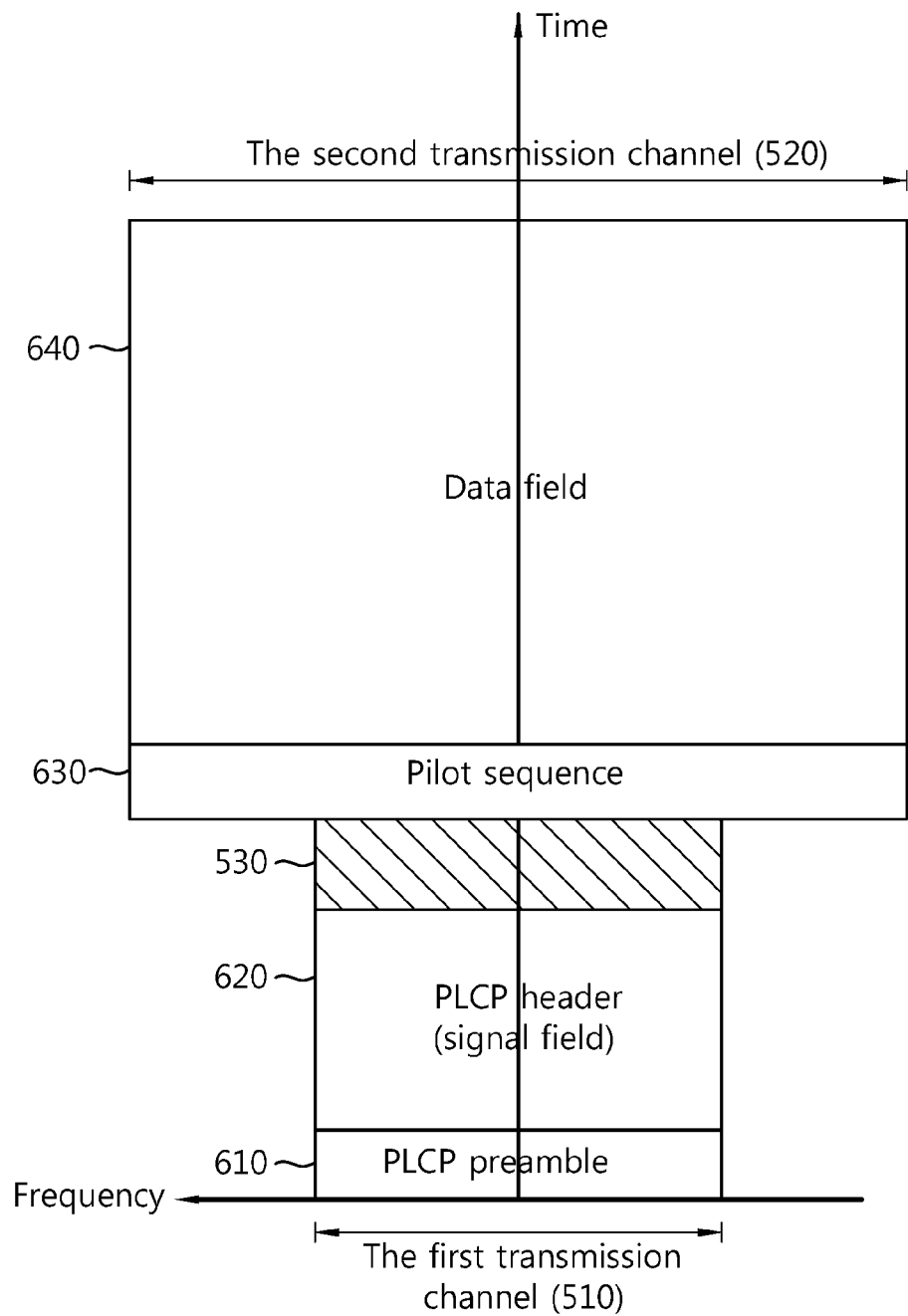
FIG. 5 shows a frame transmission method according to an exemplary embodiment of the present invention.

FIG. 5 shows a frame transmission method according to an exemplary embodiment of the present invention.

The WS STA 410 transmits a PCLP preamble 610 and a PCLP header 60 (i.e., a signal field 620) through a first transmission channel 510 having a bandwidth of 5 MHz with respect to a center frequency $f_c$.

A pilot sequence 630 and a data field 640 are transmitted through the second transmission channel 520 having a bandwidth equal to or broader than the bandwidth of the first transmission channel 510. The bandwidth of the second transmission channel 520 may be of 5 MHz, 10 MHz, 20 MHz or higher as a multiple of 5.

Although the WS STA 410 can use the bandwidth of 10 MHz or 20 MHz, the bandwidth for transmitting PLCP header 60 is limited to the bandwidth of 5 MHz. This is for maximally guaranteeing that the WS STA 410 transmits the PLCP header 60 with the maximum transmission power, e.g., 100 mW and the WS AP 420 receives the PLCP header 60 normally.

Since the first transmission channel 510 and the second transmission channel 520 are different in the bandwidth, the transmission power at the first transmission step S421 may be different from that at the second transmission step S422. For example, the transmission power at the first transmission step S421 is 100 mW, while the transmission power at the second transmission step S422 may be 40 mW.

If the WS AP 420 is located at the coverage edge of the WS STA 410, the WS AP 420 can receive the PLCP header 60 but may not receive the data field 640 since no signal is sensed in the channel. Although no signal is sensed, the WS AP 420 can ascertain that the second transmission channel 520 is in use on the basis of frame length information of the PLCD header 60.

The pilot sequence 630 may be transmitted prior to the data field 630. The pilot sequence 630 is used in channel estimation for demodulation in the second transmission channel 520.

A transition gap 530 may be arranged between the PLCP header 60 and the pilot sequence 630. The transition gap 530 is for allowing the WS AP 420 receiving the frame to perform tuning to the broadened bandwidth since the first transmission channel 510 and the second transmission channel 520 are varied in the sampling frequency and the sampling rate. If a receiving sampling rate of the WS AP 420 is in the maximum supportable sampling rate, the transition gap may not be required.

Figure 6:
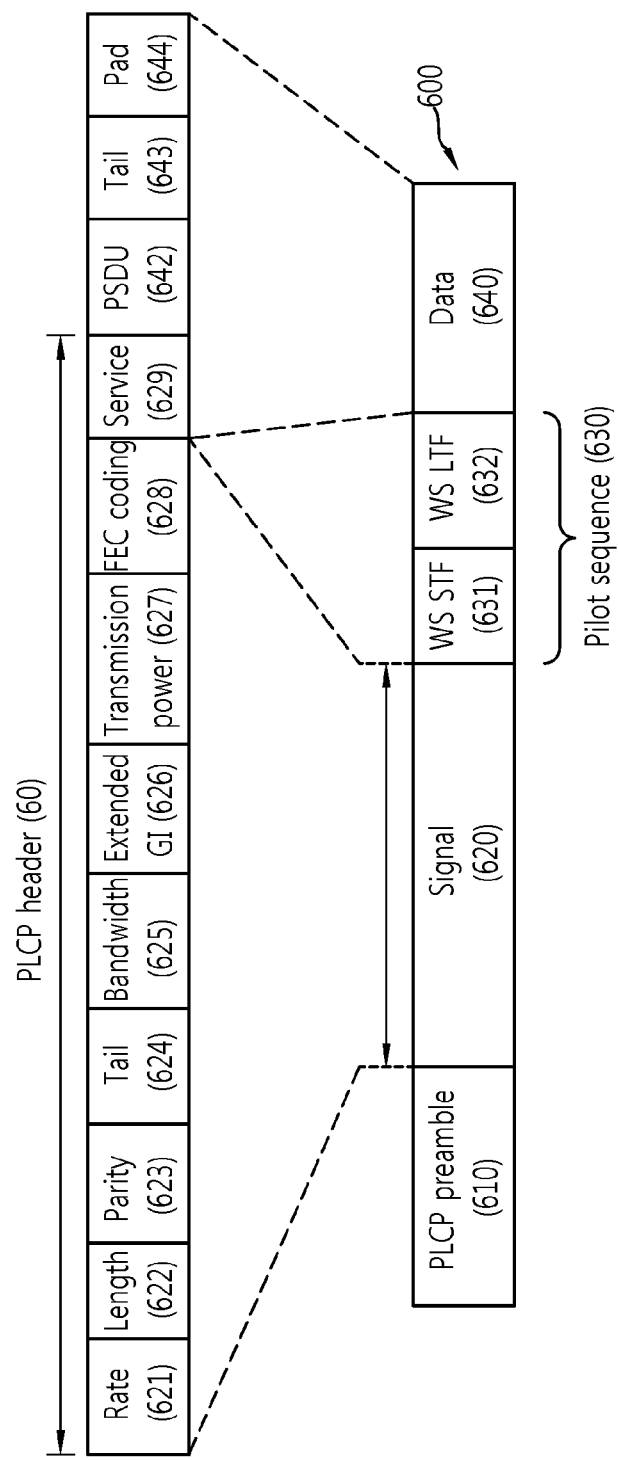
FIG. 6 is a block diagram showing a PPDU frame format according to an exemplary embodiment of the present invention.

FIG. 6 is a block diagram showing a PPDU format according to an exemplary embodiment of the present invention.

The PPDU 600 includes a PLCP preamble 610, a signal field 620, a pilot sequence 630 and a data field 640.

The PLCP preamble 610 is used for synchronization. In the WLAN system, the PLCP preamble 610 includes 12 OFDM symbols for various timing synchronization between a transmitter and a receiver, in which 10 symbols of them are short training symbols and the other 2 symbols are long training symbols.

The signal field 620 includes a rate field 621, a length field 622, a parity field 623, a tail field 624, a bandwidth field 625, an extended guard interval (GI) field 626, a transmission power field 627 and a forward error correction (FEC) coding field 628 of a PLCP header 60.

The rate field 621, the length field 622, the parity field 623 and the tail field 624 have the same functions as the fields 321, 323, 324 and 325 shown in FIG. 3.

The bandwidth field 625 indicates the bandwidth of the second transmission channel 520. If the bandwidth of the second transmission channel 520 as a transmission bandwidth of the data field 640 is signaled to the PLCP header 60, sub-carrier spacing of the PSDU 642 is determined on the basis of this signaling.

The extended GI field 626 notifies whether an extended guard interval (GI) is used. Below, the extended GI field 626 will be described with reference to FIG. 7.

Figure 7:
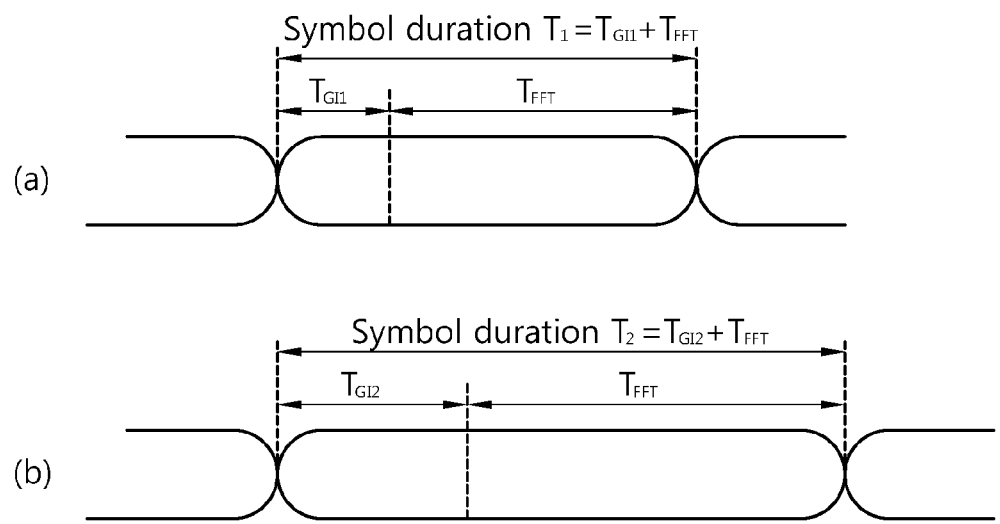
FIG. 7 is an enlarged view of OFDM symbol duration of one cycle.

FIG. 7 is an enlarged figure of OFDM symbol duration of one cycle.

In FIG. 7, (a) shows a conventional OFDM symbol duration $T_1$, and (b) shows a OFDM symbol duration $T_2$ according to an exemplary embodiment of the present invention. Each of the OFDM symbol durations $T_1$ and $T_2$ is shown as the sum of each of GI durations $T_{GI1}$ and $T_{GI2}$ and each of fast Fourier transform (FFT) integration time thereof.

The extended GI duration $T_{GI2}$ is longer than the conventional GI duration $T_{GI1}$ being used in the conventional IEEE 802.11 standard.

In the case that communication based on the WLAN is performed in the TV WS, rich scattering due to an external environment may cause a delay spread to become larger. Since the OFDM symbol is received through the extended GI, stability of receiving the OFDM symbol can be enhanced by securing sufficient time duration.

In the case of using the extended GI, there is a need for changing parameters indicating the extended GI and the symbol duration. However, the symbol duration may become larger in the case of employing the extended GI.

Referring back to FIG. 6, the transmission power field 627 indicates transmission power constraint when using the second transmission channel.

The FEC coding field 628 denotes whether to use an FEC code and/or whether to use which code scheme.

The pilot sequence 630 includes a WS short training field (STF) 631 and a WS long training field (LTF) 632.

The WS STF 631 and the WS LTF 632 are fields for synchronization with the sub-carrier spacing corresponding to a changed channel bandwidth and channel estimation. It was mentioned above that the pilot sequence needs to be transmitted for estimating the channel of the broadened bandwidth in the case that the second transmission channel 520 is used by broadening the bandwidth for the broadband communication in transmitting the data field 640 while the first transmission channel 510 is used for communication.

The WS STF 631 is used for AGC convergence, diversity selection, timing acquisition and frequency synchronization acquisition. The WS LTF 632 is used for channel estimation and delicate frequency synchronization acquisition.

The data field 640 includes a service field 629 of the PLCP header 60, a PSDU 642, a tail field 643 and a pad field. Here, the tail field 643 and the pad field 644 have the same functions as the tail field 333 and the pad field 334 of FIG. 3.

The data field 640 is encoded according to data rates and scrambled before the transmission.

The service field 629 is a field included in the PLCP header 60 but transmitted as being included in the data field 640 of the PPDU frame 600. This is for initializing the scrambler.

The format of the PPDU 600 is nothing but an example. The term or location of each field may be varied. Also, some fields of the PPDU 600 may be omitted, and other fields may be added.

Figure 8:
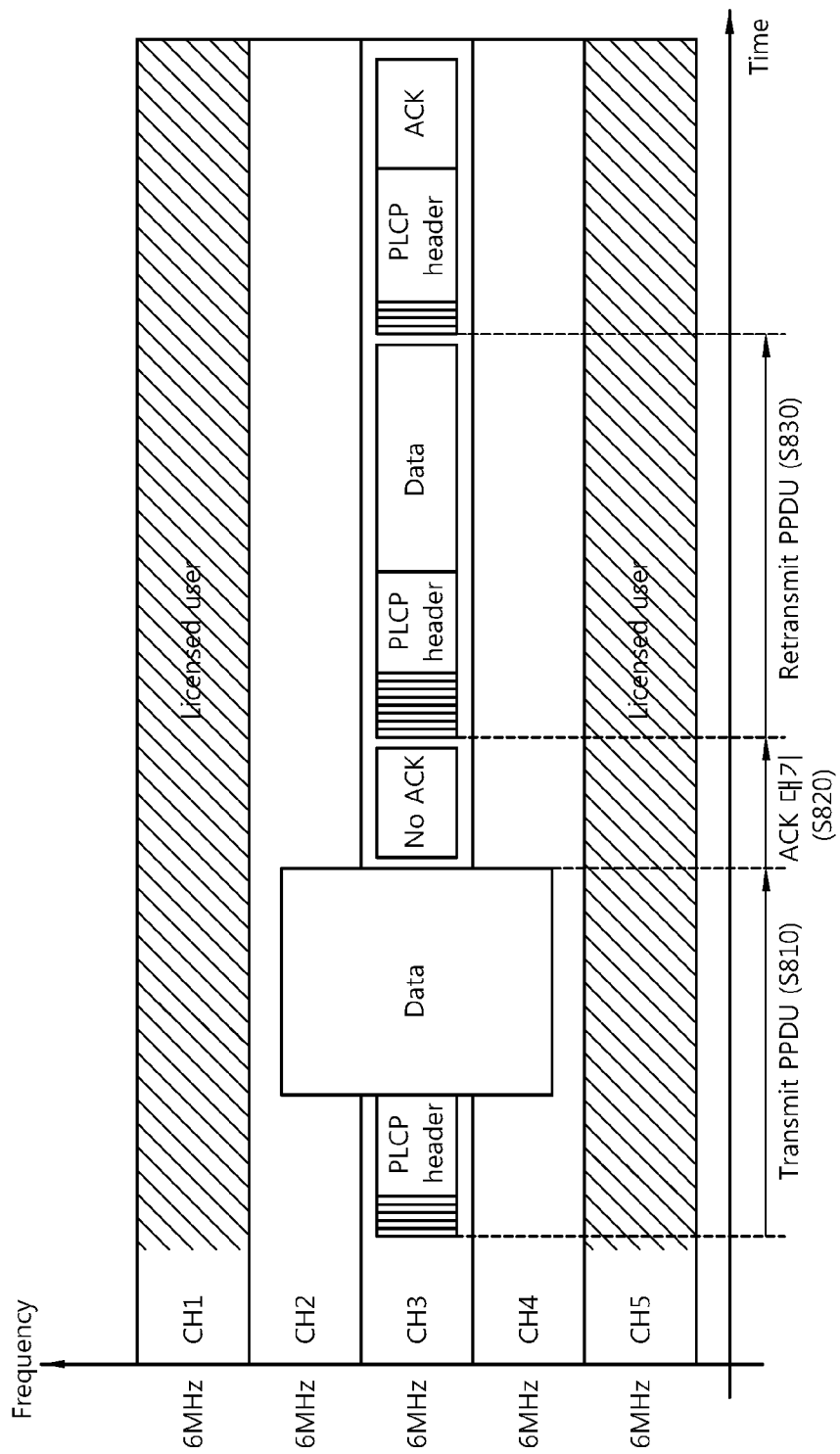
FIG. 8 shows an example of using a channel according to an exemplary embodiment of the present invention.

FIG. 8 shows an example of using a channel according to an exemplary embodiment of the present invention.

Referring to FIG. 8, there are 5 WS channels CH1~CH5 having a bandwidth of 6 MHz. 3 WS channels CH2 through CH4 in the middle are unoccupied, but 2 WS channels CH1 and CH5 in both sides are occupied by the licensed user.

First, the WS STA transmits a PPDU to the WS AP (S810). The PLCP header of the PPDU is transmitted in a bandwidth of 5 MHz, and the data field is transmitted in a bandwidth of 15 MHz. The PLCP header is transmitted with the maximum transmission power. On the other hand, the data field is transmitted with relatively low transmission power since the adjacent channels are occupied by the licensed user.

The WS STA is on standby to receive acknowledgement (ACK) from the WS AP (S820). If receiving the ACK, the WS STA may transmit the PPDU in the same manner as ever.

If receiving no ACK from the WS AP after a lapse of predetermined time, the WS STA retransmits the PPDU (S830). In the retransmitted PPDU, the bandwidth of the data field becomes narrower, and the transmission power thereof becomes higher. For example, the bandwidth of the data field is equalized with the bandwidth of the signal field, and the transmission power thereof is set as the maximum transmission power.

Figure 9:
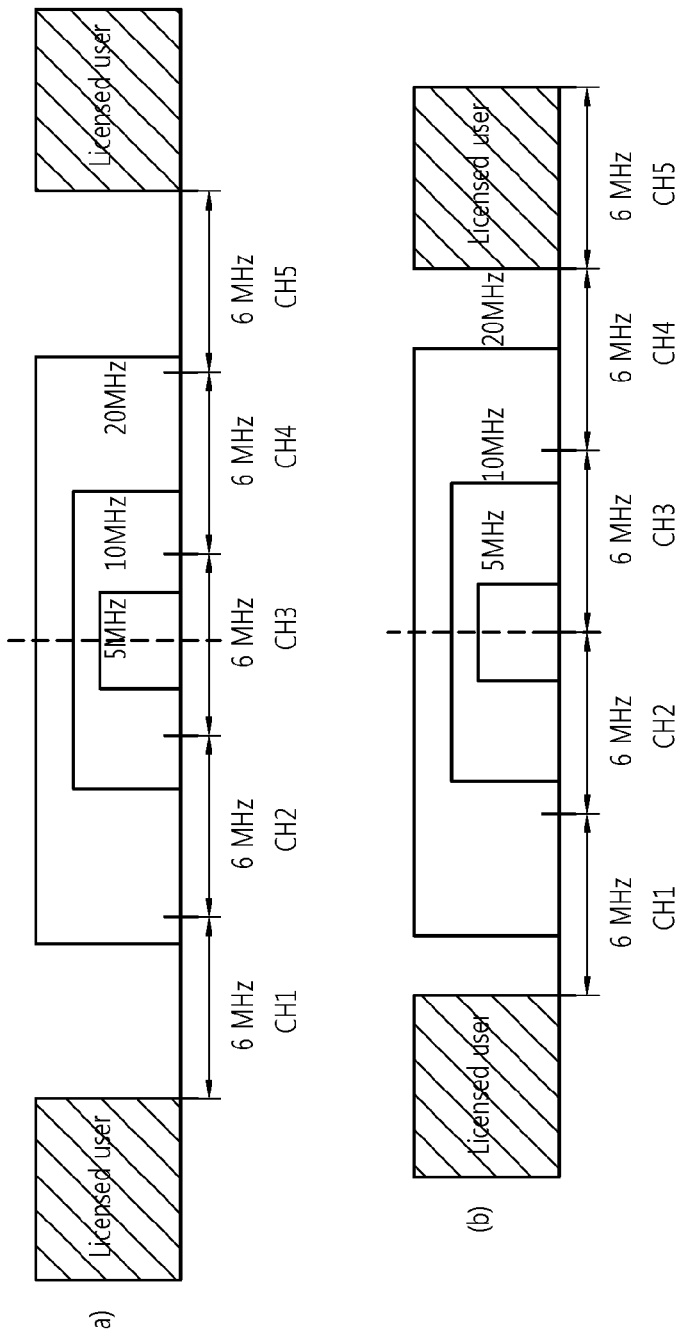
FIG. 9 shows a channel bandwidth adaptation mechanism according to an exemplary embodiment of the present invention.

FIG. 9 shows a channel bandwidth adaptation mechanism according to an exemplary embodiment of the present invention.

In the WLAN system supporting the TV WS, the WS STA acquires information about at least ones WS channel of the TV WS by its own spectrum sensing or receiving a spectrum sensing result ascertained by the WS AP. Determination of the transmission channel on the basis of the above information is called a channel bandwidth adaptation mechanism.

In FIG. 9, (a) shows that the center frequency $f_c$ of the transmission channel used by the WS STA is placed in the center of the WS channel of 6 MHz. Therefore, one WS channel is needed to use the transmission channel of 5 MHz. However, 3 WS channels CH2 through CH4 and 5 WS channels CH1 through CH5 are required to use the transmission channels of 10 MHz and 20 MHz, respectively.

On the other hand, (b) of FIG. 9 shows that the center frequency $f_c$ of the transmission channel is placed in the edge of the WS channel. In this case, 2 WS channels CH2 and CH3 are needed to use the transmission channel of 5 MHz. However, 2 WS channels CH2 and CH3 and 4 WS channels CH1 through CH4 are required to use the transmission channels of 10 MHz and 20 MHz, respectively. At this time, it is impossible to select the transmission channel and transmit the frame even if one WS channel is unoccupied. Accordingly, there is a need for a transmission channel adaptation method optimized depending on environments of a given WS channel.

Thus, the center frequency of the transmission channel has to be locatable in both the center and the edge of the WS channel. To this end, when the WS STA scans the WS AP in the WLAN supporting the TV WS, a frequency raster may be managed by a fundamental unit of 3 MHz. Also, when the WS STA scans the WS AP, the fundamental unit has to be of 5 MHz.

Figure 10:
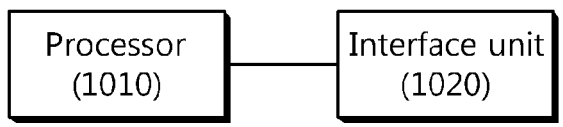
FIG. 10 shows a block diagram showing a wireless apparatus according to an exemplary embodiment of the present invention.

FIG. 10 shows a block diagram showing a wireless apparatus according to an exemplary embodiment of the present invention. A wireless apparatus 1000 may be a part of the WS STA or the WS AP. The wireless apparatus 1000 can support the TV WS.

The wireless apparatus 1000 may include a processor 1010 and an interface unit 1020. The processor 1010 and the interface unit 1020 may be connected functionally.

The processor 1010 generates a PPDU according to an exemplary embodiment of the present invention. The interface unit 1020 transmits the generated PPDU through a wireless medium.

The processor 1010 may include an application-specific integrated circuit (ASIC), other chipsets, a logic circuit and/or a data processing device.

In the foregoing exemplary embodiment, the TV WS band was described as an example of the frequency band and the bandwidth of the channel, but not limited thereto. Alternatively, the frequency band and the bandwidth of the channel may be applied to all frequency bands of an environment where the transmission power constraint is given according to communication performing environments. Also, specific values of the frequency bandwidth of each transmission channel are nothing but an example. Alternatively, any value can be selected for the frequency bandwidth of each transmission channel as long as the variation of the bandwidth of the transmission channel causes the transmission power constraint to be changed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a physical layer convergence procedure (PLCP) protocol data unit (PPDU) of a station (STA) in a wireless local area network (WLAN), the method comprising:
   generating a PPDU including a first part and a second part; and
   transmitting the PPDU,
   wherein the first part includes a Short Training Field (STF), a Long Training Field (LTF) and a SIGNAL field, and the second part includes a Data Field,
   wherein the SIGNAL field includes a first information field indicating a bandwidth of the second part of the PPDU and a second information field indicating a guard interval of the second part, and
   wherein a transmission power of the second part does not exceed a transmission power of the first part.

2. The method of claim 1, wherein at least one of the STF or the LTF is arranged in front of the SIGNAL field, and
   wherein a training sequence is arranged between the SIGNAL field and the Data field.

3. The method of claim 1, wherein a transmission bandwidth of the first part does not exceed a transmission bandwidth of the second part.

4. The method of claim 1, wherein the bandwidth of the second part of the PPDU is variable among N MHz, 2*N MHz and 4*N MHz,
   wherein N is an integer value, and
   wherein 4*N MHz does not exceed 20 MHz.

5. A wireless apparatus for transmitting a physical layer convergence procedure (PLCP) protocol data unit (PPDU) of a station (STA) in a wireless local area network (WLAN), the wireless apparatus comprising:
   an interface unit which transmits the PPDU; and
   a processor which functionally connects with the interface unit and generates the PPDU including a first part and a second part,
   wherein the first part includes a Short Training Field (STF), a Long Training Field (LTF) and a SIGNAL field, and the second part includes a Data field,
   wherein the SIGNAL field includes a first information field indicating a bandwidth of the second part of the PPDU and a second information field indicating a guard interval of the second part, and
   wherein a transmission power of the second part does not exceed a transmission power of the first part.

6. The wireless apparatus of claim 5, wherein at least one of the STF or the LTF is arranged in front of the SIGNAL field, and
   wherein a training sequence is arranged between the SIGNAL field and the Data field.

7. The wireless apparatus of claim 5, wherein a transmission bandwidth of the first part does not exceed a transmission bandwidth of the second part.

8. The wireless apparatus of claim 5, wherein the bandwidth of the second part of the PPDU is variable among N MHz, 2*N MHz and 4*N MHz,
   wherein N is an integer value, and
   wherein 4*N MHz does not exceed 20 MHz.

* * * * *